United States Patent
Hanzawa et al.

(10) Patent No.: US 8,332,117 B2
(45) Date of Patent: Dec. 11, 2012

(54) ACCELERATION CONTROL APPARATUS FOR VEHICLE

(75) Inventors: Masatoshi Hanzawa, Kariya (JP);
Masayoshi Takeda, Kariya (JP);
Hiroyuki Kodama, Kariya (JP); Hajime Kumabe, Kariya (JP)

(73) Assignees: Advics Co., Ltd., Aichi-pref. (JP);
DENSO CORPORATION, Kariya (JP)

( * ) Notice: Subject to any disclaimer, the term of this patent is extended or adjusted under 35 U.S.C. 154(b) by 227 days.

(21) Appl. No.: 12/801,846

(22) Filed: Jun. 29, 2010

(65) Prior Publication Data
US 2010/0332096 A1    Dec. 30, 2010

(30) Foreign Application Priority Data

Jun. 30, 2009 (JP) .................................. 2009-155596
Jun. 4, 2010 (JP) .................................. 2010-129080

(51) Int. Cl.
*G06F 3/00* (2006.01)
*G06F 13/00* (2006.01)
*B60Q 1/50* (2006.01)

(52) U.S. Cl. .......................... 701/70; 340/467; 477/905

(58) Field of Classification Search ................... 701/70; 700/44, 45
See application file for complete search history.

(56) References Cited

U.S. PATENT DOCUMENTS

| | | | |
|---|---|---|---|
| 6,496,771 B2* | 12/2002 | Hattori et al. | 701/96 |
| 7,027,904 B2* | 4/2006 | Ishizu et al. | 701/93 |
| 7,835,845 B2* | 11/2010 | Lin | 701/70 |
| 8,055,424 B2* | 11/2011 | Salman et al. | 701/80 |
| 2007/0129871 A1* | 6/2007 | Post et al. | 701/69 |
| 2008/0140291 A1* | 6/2008 | Kobayashi et al. | 701/70 |
| 2009/0055068 A1 | 2/2009 | Osaki et al. | |

* cited by examiner

*Primary Examiner* — Thomas Tarcza
*Assistant Examiner* — Tyler J Lee
(74) *Attorney, Agent, or Firm* — Posz Law Group, PLC

(57) ABSTRACT

An object of the invention is to provide an acceleration control apparatus, according to which accuracy for feed-forward torque may not be decreased even when a calculating accuracy for an estimated-slope torque would be decreased. Reliability of estimated slope is calculated and feedback torque is corrected, in such a manner that a gain for a feedback control portion is increased when the reliability of the estimated slope becomes lower. It is, therefore, possible to compensate a possible decrease of the accuracy of the feed-forward torque by correcting the feedback torque in accordance with the reliability of the estimated slope.

12 Claims, 13 Drawing Sheets

| CHECKING ITEMS FOR ERRORS OF ESTIMATED-SLOPE TORQUE | MAXIMUM VALUE FOR ERROR |
|---|---|
| RELIABILITY FOR TRAVEL FREQUENCY (AGED DETERIORATION) | ± 0.1 G |
| RELIABILITY FOR TEMPERATURE OF ACCELERATION SENSOR | ± 0.05 G |
| RELIABILITY FOR LEARNING FOR ONBOARD CONDITION | ± 0.08 G |
| RELIABILITY FOR LEVEL OF PUNISHING ROAD | ± 0.1 G |

IN A CASE THAT RELIABILITY OF ESTIMATED SLOPE IS LOW
(RANGE OF ERROR IS 0.13G)

IN A CASE THAT RELIABILITY OF ESTIMATED SLOPE IS HIGH
(RANGE OF ERROR IS 0.01G)

ACCELERATION CONTROL APPARATUS FOR VEHICLE

CROSS REFERENCE TO RELATED APPLICATION

This application is based on Japanese Patent Application No. 2009-155596 filed on Jun. 30, 2009, and Japanese Patent Application No. 2010-129080 filed on Jun. 4, 2010, the disclosures of which are incorporated herein by reference.

FIELD OF THE INVENTION

The present invention relates to an acceleration control apparatus for a vehicle for achieving a required acceleration in a vehicle traveling direction through a feed-forward control and a feedback control.

BACKGROUND OF THE INVENTION

A vehicle-travel control apparatus is known in the art, for example, as disclosed in Japanese Patent Publication No. 2009-051310, according to which a vehicle acceleration in a vehicle traveling direction is automatically controlled at a desired value. According to the vehicle-travel control apparatus of the above Patent Publication, generation of slip is surely suppressed to thereby automatically drive a vehicle. In order to achieve an automatic vehicle drive, an allowable torque which would not cause a wheel slip is calculated based on a ground load of a wheel as well as a coefficient of friction of a road surface. Furthermore, a limiting acceleration, which would be acted on the vehicle when the calculated allowable torque is applied to the vehicle wheel, is calculated. And a feed-forward torque, which would correspond to an acceleration actually acted on the vehicle, is calculated based on a comparison between the limiting acceleration and a demand acceleration.

The ground loads of the respective wheels differ from the wheel to wheel depending on a slope of the road surface. For example, in case of an uphill slope, the ground loads of front wheels become smaller, while the ground loads of rear wheels become larger. On the other hand, in case of a downhill slope, the above relationship is reversed. Therefore, the ground loads of the respective wheels are calculated by taking dynamic load distribution calculated from the slope of the road surface into consideration, so that the automatic vehicle travel can be done depending on various conditions of the road surface.

The above feed-forward torque is calculated by adding to each other a demand torque corresponding to the demand acceleration and an estimated-slope torque included in the ground load corresponding to the slope of the road surface. Therefore, in a case that calculation accuracy for the estimated-slope torque is decreased for some reason, accuracy for the feed-forward torque may be correspondingly decreased.

SUMMARY OF THE INVENTION

The present invention is, therefore, made in view of the foregoing problem, and has an object to provide an acceleration control apparatus for a vehicle, according to which the accuracy for the feed-forward torque may not be decreased even in the case that the calculation accuracy for the estimated-slope torque would be decreased.

According to a feature of the invention, in an acceleration control apparatus for a vehicle, a demand torque for controlling an acceleration of the vehicle in a vehicle traveling direction is outputted based on a feed-forward torque from a feed-forward control portion and a feedback torque from a feedback control portion. The acceleration control apparatus further has a reliability calculating portion for calculating reliability of an estimated slope, and a feedback torque correcting portion for correcting the feedback torque in such a way that a gain for the feedback control portion is increased in response to a decrease of the reliability of the estimated slope calculated at the reliability calculating portion.

As above, according to the invention, not only the reliability of the estimated slope is calculated, but also the feedback torque is corrected in such a way that the gain for the feedback control portion is increased in response to the decrease of the reliability of the estimated slope. Thus, the feedback torque can be calculated, wherein the feedback torque is corrected in accordance with the reliability of the estimated slope. As a result, even in the case that reliability of estimated-slope torque is decreased and thereby accuracy for the feed-forward torque is decreased, it becomes possible to compensate a possible decrease of the accuracy for the feed-forward torque by correcting the feedback torque depending on the reliability of the estimated slope. Accordingly, it is possible to suppress in a comprehensive manner the decrease of the accuracy for the feed-forward torque, even when calculating accuracy for the estimated-slope torque is decreased.

According to another feature of the invention, the acceleration control apparatus further has an estimated-slope torque correcting portion for correcting the estimated-slope torque in response to a decrease of the reliability of the estimated slope calculated at the reliability calculating portion, wherein the feed-forward control portion calculates the feed-forward torque based on the reliability of the estimated slope, which is corrected at the estimated-slope torque correcting portion.

As above, the estimated-slope torque is corrected depending on the reliability of the estimated slope, and then the feed-forward torque is calculated based on the estimated-slope torque (after correction). Namely, the estimated-slope torque is not directly used for the calculation of the feed-forward torque, but the estimated-slope torque is also corrected depending on the reliability of the estimated slope. As a result, a possible decrease of the accuracy for the feed-forward torque itself is suppressed. And in addition, a decrease of accuracy for feed-forward control is suppressed.

According to a third feature of the invention, the acceleration control apparatus further has an estimated-slope torque correcting portion for correcting the estimated-slope torque in response to the decrease of the reliability of the estimated slope calculated at the reliability calculating portion, and the feed-forward control portion calculates the feed-forward torque based on the estimated-slope torque, which is corrected at the estimated-slope torque correcting portion.

According to the above feature, the decrease of accuracy for the feed-forward torque is suppressed to a smaller amount. In addition, the demand torque is corrected on a side of the feedback control. As a result, the demand torque can be corrected more accurately, when compared with a case in which only the feed-forward torque is corrected. It is, therefore, possible to surely suppress the decrease of the accuracy for the feed-forward control.

According to a fourth feature of the invention, the estimated-slope torque correcting portion corrects the estimated-slope torque in such a way that an absolute figure of the estimated-slope torque is decreased in response to the decrease of the reliability of the estimated slope calculated at the reliability calculating portion.

As above, when the absolute figure of the estimated-slope torque is decreased in response to the decrease of the reliability of the estimated slope, it becomes possible to reduce a ratio of involvement of the estimated-slope torque, to thereby decrease an influence of error for the estimated slope.

According to a fifth feature of the invention, the estimated-slope torque correcting portion may calculate a range of error for the estimated-slope torque in response to the decrease of the reliability of the estimated slope calculated at the reliability calculating portion, and may correct the estimated-slope torque in accordance with the range of error.

As above, when the estimated-slope torque is corrected in accordance with the range of error, it is possible to decide a range for making the estimated-slope torque smaller after confirming the range of error. Accordingly, it is possible to adequately correct the estimated-slope torque by a proper correcting amount.

Furthermore, according to a sixth feature of the invention, the feedback torque correcting portion has a map or a function expression, which shows a relationship between the reliability of the estimated slope and a coefficient of the reliability for the feedback control. And the feedback torque correcting portion calculates the coefficient of the reliability for the feedback control, which corresponds to the reliability of the estimated slope, based on the map or the function expression. Then, the feedback torque correcting portion corrects the feedback torque based on the coefficient of the reliability for the feedback control.

The above map or the function expression, which shows the relationship between the reliability of the estimated slope and the coefficient of the reliability for the feedback control, may be obtained in advance through simulation, actual vehicle traveling tests, and so on. Since the coefficient of the reliability for the feedback control is obtained based on the map or the function expression, it is possible to adequately correct the feedback torque.

In addition, according to a seventh feature of the invention, the feedback torque correcting portion corrects the feedback torque based on the demand axle torque and the estimated-slope torque (after correction). Namely, the coefficient of the reliability for the feedback control may be obtained based on a ratio between absolute figures of the demand axle torque and the estimated-slope torque (after correction). And the feedback torque is corrected in accordance with not only the degree of incidence but also the reliability for the estimated-slope torque.

According to an eighth feature of the, the feedback torque correcting portion corrects the coefficient of the reliability for the feedback control with respect to the reliability of the estimated slope, in such a manner that the coefficient of the reliability for the feedback control becomes larger when a ratio of an absolute figure of the estimated-slope torque (after correction) against an absolute figure of the demand axle torque becomes larger. As a result, it is possible to adequately correct the feedback torque.

According to a ninth feature of the invention, the feedback torque correcting portion has multiple maps for a relationship between the coefficient of the reliability for the feedback control and the reliability of the estimated-slope, wherein the relationships in the respective maps are different from each other, and the feedback torque correcting portion selects one of the maps based on the ratio of the absolute figure of the estimated-slope torque (after correction) against the absolute figure of the demand axle torque. According to the feedback torque correcting portion, the relationship between the coefficient of the reliability for the feedback control and the reliability of the estimated-slope is set in such a manner that the coefficient of the reliability for the feedback control in the map, which is selected when the ratio of the absolute figure of the estimated-slope torque (after correction) with respect to the absolute figure of the demand axle torque is larger, is larger than the coefficient of the reliability for the feedback control in the map, which is selected when the ratio of the absolute figure of the estimated-slope torque (after correction) with respect to the absolute figure of the demand axle torque is smaller. As a result, it is possible to correct the coefficient of the reliability for the feedback control without complicated calculation.

According to a tenth feature of the invention, the estimated-slope torque is a physical value, which is converted into a torque from an estimated-slope acceleration applied to the vehicle in the vehicle traveling direction due to the slope of the road surface. The feedback control portion outputs a power-train feedback torque and a brake feedback torque as the feedback torque. And the feed-forward control portion calculates the feed-forward torque based on a demand axle torque corresponding to the demand torque for controlling acceleration of the vehicle in the vehicle traveling direction and based on the estimated-slope torque (after correction) which is corrected by the estimated-slope torque correcting portion.

As a result that the error of the estimated slope is generated, alternate and intermittent driving operation and braking operation are likely to occur. Therefore, the present invention may be preferably applied to the acceleration control apparatus, in which the feed-forward torque is calculated based on the demand axle torque and the torque of the road surface slope, and the power-train feedback torque as well as the braking feedback torque is outputted as the feedback torque.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
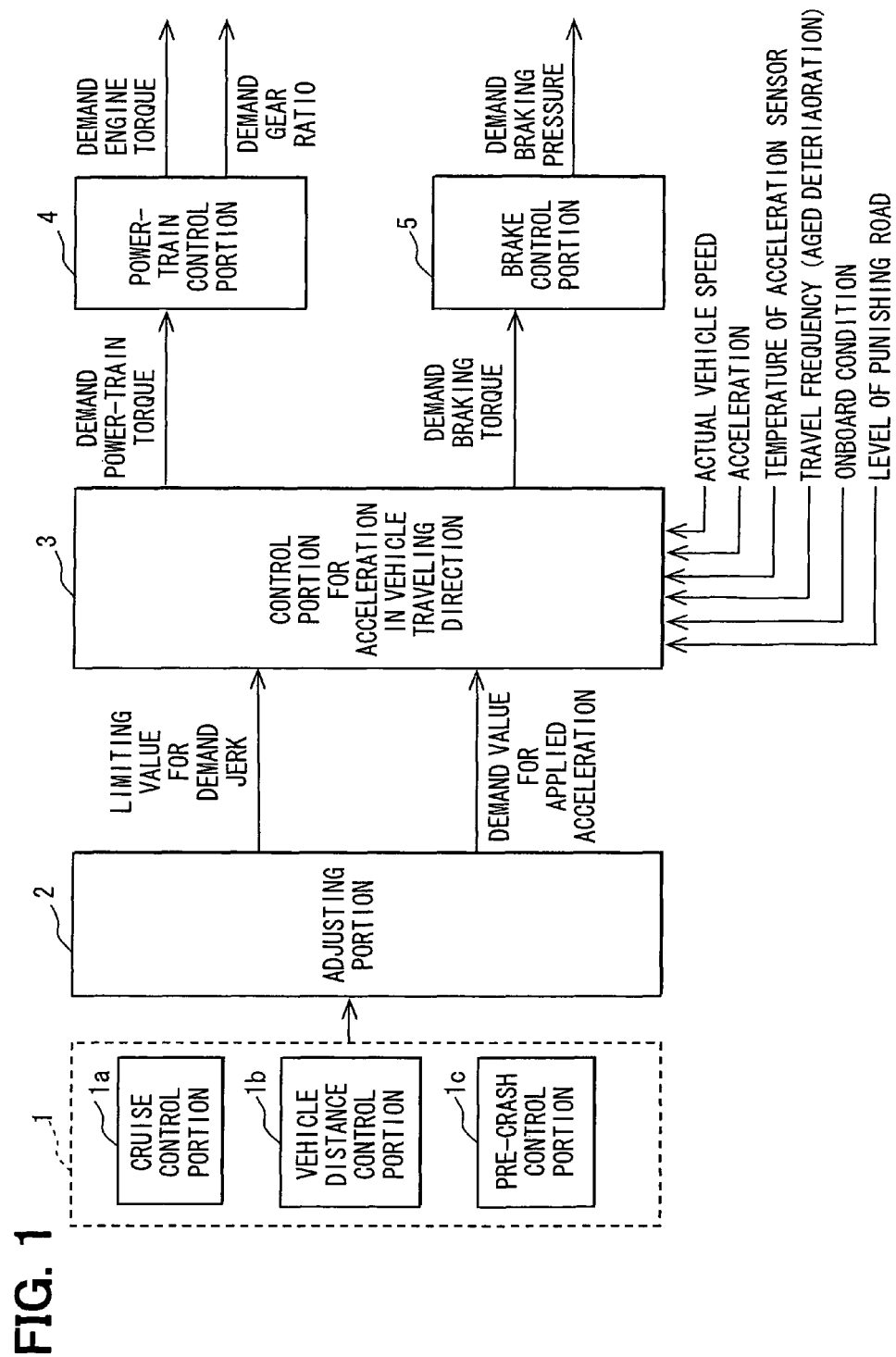
FIG. 1 is a block diagram showing a vehicle driving-braking control system according to a first embodiment of the present invention.

Embodiments of the present invention will be hereinafter explained with reference to drawings. The same reference numerals are used through the following embodiments for such portions which are identical or equivalent to each other.

First Embodiment

A first embodiment of the present invention will be explained. In the first embodiment, an acceleration control apparatus for a vehicle, which is applied to a vehicle driving-braking control system, will be explained.

FIG. 1 is a block diagram showing the vehicle driving-braking control system (hereinafter also referred to as a vehicle control system). As shown in FIG. 1, the vehicle control system has an acceleration demanding portion 1, an adjusting portion 2, a control portion 3 for acceleration in a vehicle traveling direction, a power-train control portion 4, and a brake control portion 5. The control portion 3 among the above portions corresponds to the acceleration control apparatus for the acceleration in the vehicle traveling direction.

The acceleration demanding portion 1 outputs a demand signal for acceleration depending on a vehicle condition, in accordance with demands from respective applications (respective control portions) for carrying out a vehicle acceleration control in the vehicle traveling direction. According to the present embodiment, the acceleration demanding portion 1 for carrying out the respective applications is composed of a cruise control portion 1a, a vehicle distance control portion 1b, and a pre-crash control portion 1c. The cruise control portion 1a outputs a demand signal for acceleration, which is necessary for controlling a vehicle traveling speed at a constant value. The vehicle distance control portion 1b outputs a demand signal for acceleration, which is necessary for controlling a distance to a front vehicle at a predetermined value. The pre-crash control portion 1c outputs a demand signal for acceleration which is necessary for avoiding a crash with the front vehicle.

The adjusting portion 2 adjusts accelerations indicated by the respective demand signals from the acceleration demanding portion 1 in order to output a variation of an acceleration demanding value for each control cycle. Namely, the adjusting portion 2 outputs a jerk, which corresponds to a differentiated value of the acceleration demanding value in the vehicle traveling direction, as a demand value for an applied acceleration. In addition, the adjusting portion 2 calculates a limiting value for the jerk depending on the vehicle condition and outputs it as a limiting value for a demand jerk.

The control portion 3 for the acceleration in the vehicle traveling direction (also referred to as an acceleration control portion) receives not only the above differentiated value of the acceleration demanding value (that is, the demand value for the applied acceleration) and the limiting value for the demand jerk from the adjusting portion 2 but also various information (data), such as, actual vehicle speed, travel frequency (aged deterioration), vehicle acceleration (a value from an acceleration sensor), temperature of the acceleration sensor, onboard condition (such as, laden weight), a level of a punishing road, and so on. Then, the acceleration control portion 3 calculates a demand power-train torque as well as a demand braking torque.

For example, the acceleration control portion 3 receives the data for the actual vehicle speed from a meter ECU (not shown); the data for the acceleration and the temperature of the acceleration sensor from an acceleration sensor (not shown) having a function for detecting temperature; the data for the aged deterioration (the travel frequency) from an ECU (not shown) for controlling current supply to the acceleration sensor; the data for the onboard condition (e.g. laden weight) from a detection signal of a vehicle height sensor used for adjusting a position of a headlight or from an ECU (not shown) for calculating the laden weight based on a relationship between engine torque and the actual acceleration; and the data for the level of the punishing road from a brake ECU (not shown).

Figure 2:
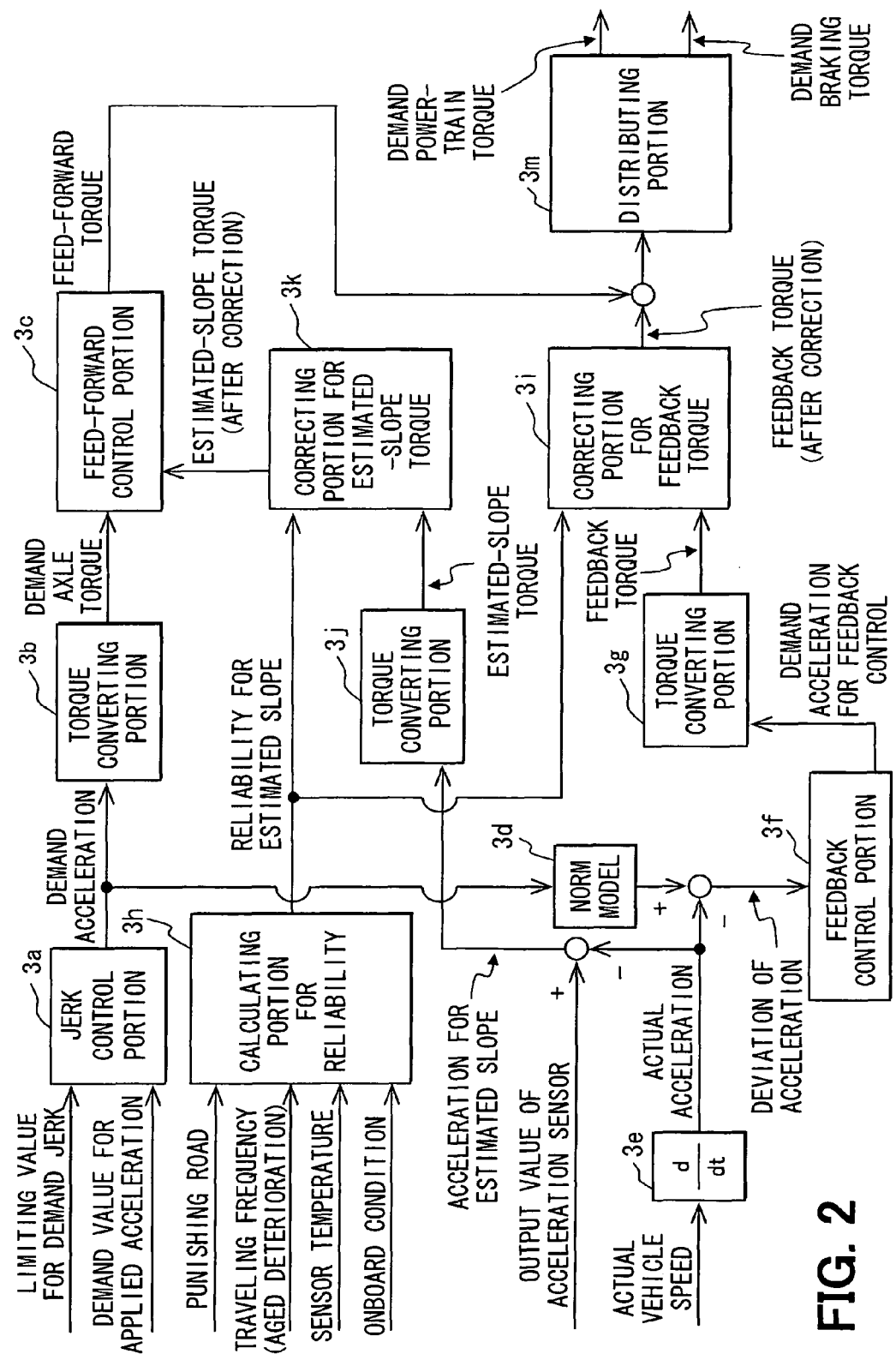
FIG. 2 is a block diagram schematically showing an inside structure of a control portion 3 for acceleration in a vehicle traveling direction.

More exactly, the acceleration control portion 3 carries out feed-forward control and feedback control based on the demand value for the applied acceleration, the limiting value for the demand jerk, and the above various data, to thereby calculate the demand power-train torque and the demand braking torque. FIG. 2 is a block diagram schematically showing an inside structure of the acceleration control portion 3.

As shown in FIG. 2, the acceleration control portion 3 is composed of a jerk control portion 3a, a torque converting portion 3b, a feed-forward control portion 3c, a memory portion 3d for a norm model, a differential portion 3e, a feedback control portion 3f, a torque converting portion 3g, a calculating portion 3h for calculating reliability of an estimated slope (also referred to as a reliability calculating portion), a correcting portion 3i for a feedback torque (also referred to as a feedback-torque correcting portion), a torque converting portion 3j, a correcting portion 3k for an estimated-slope torque (also referred to as an estimated-slope torque correcting portion), and a distributing portion 3m.

The jerk control portion 3a calculates a demand acceleration corresponding to the demand value for the applied application outputted from the adjusting portion 2. In the above calculation, the jerk control portion 3a calculates the demand acceleration, while a variation of the acceleration is limited by the limiting value for the demand jerk also outputted from the adjusting portion 2. For example, in the case that the demand value for the applied acceleration is a demand for accelerating a vehicle, the demand acceleration becomes a positive value. On the other hand, in the case that the demand value for the applied acceleration is a demand for decelerating the vehicle, the demand acceleration becomes a negative value.

The torque converting portion 3b calculates to convert the demand acceleration calculated by the jerk control portion 3a into a torque, so that the demand acceleration is converted into a demand axle torque. A relationship between acceleration and axle torque is in advance obtained based on an equation of motion and vehicle specifications. The torque conversion from the demand acceleration to the demand axle torque is carried out based on such relationship.

The feed-forward control portion 3c carries out a feed-forward control in order to bring an actual vehicle acceleration to a value close to the demand value for the applied acceleration. More exactly, the feed-forward control portion 3c calculates a feed-forward torque based on the demand axle torque outputted from the torque converting portion 3b as well as an estimated-slope torque (after correction), which is calculated at the correcting portion 3k for the estimated-slope torque. Namely, the estimated-slope torque (after correction) inputted to the feed-forward control portion 3c is added to the demand axle torque from the torque converting portion 3b. Although not shown in FIG. 2, an estimated brake torque as well as an estimated power-train torque is also inputted to the feed-forward control portion 3c, so that a power-train feed-forward torque as well as a brake feed-forward torque is calculated based on such inputted estimated torque.

The memory portion 3d for the norm model stores a norm model for carrying out the feedback control, according to which a demand (power-train or braking) acceleration is calculated corresponding to the inputted demand acceleration. The norm model used here is in advance set depending on individual vehicle characteristics. The norm model includes a power-train norm model for calculating and setting a demand power-train acceleration and a brake norm model for calculating and setting a demand braking acceleration.

The differential portion 3e calculates an actually generated acceleration (hereinafter, an actual acceleration) by differentiating the actual vehicle speed indicated by the vehicle speed data. The vehicle speed data can be obtained via a vehicle LAN, for example, from the meter ECU (not shown). In the present embodiment, the actual acceleration is calculated by the differential portion 3e. However, if the actual acceleration is already calculated by another ECU (not shown), such calculated value (the actual acceleration) may be inputted to the acceleration control portion 3.

The feedback control portion 3f carries out the feedback control in order to bring the actual acceleration to the value close to the demand value for the applied acceleration. More exactly, the feedback control portion 3f calculates a demand acceleration for the feedback control so that a deviation of the acceleration (which is obtained by subtracting the actual acceleration from the demand acceleration set by the memory portion 3d for the norm model) may become closer to zero. Namely, the feedback control portion 3f calculates a demand acceleration for a power-train feedback control as well as a demand acceleration for a brake feedback control. In the above calculation of the power-train feedback and/or the brake feedback control, a well known control (such as PID control etc.) used in a calculation for a general feedback control can be used.

The torque converting portion 3g converts the demand acceleration for the feedback control calculated at the feedback control portion 3f into a torque, so that a feedback torque is obtained corresponding to the demand acceleration. Namely, each of the demand acceleration for the power-train feedback control and the brake feedback control is converted into torques, so that a power-train feedback torque and a brake feedback torque are calculated.

The reliability calculating portion 3h calculates reliability of the estimated slope based on input data, such as the travel frequency (the aged deterioration), the temperature of the acceleration sensor, the onboard condition, and the level of the punishing road. A method of calculating the reliability of the estimated slope will be explained below more in detail.

The feedback-torque correcting portion 3i corrects the feedback torque (which is converted at the torque converting portion 3g) based on the reliability of the estimated slope (which is calculated at the reliability calculating portion 3h), in order to calculate a feedback torque (after correction). A method of calculating the feedback torque (after correction) will be also explained below more in detail. The feedback torque (after correction) is also referred to as "after-correction feedback torque" or "corrected feedback torque".

The torque converting portion 3j converts an acceleration for the estimated slope into a torque, to thereby calculate an estimated-slope torque. The acceleration for the estimated slope (also referred to as an estimated-slope acceleration) corresponds to a deviation between the acceleration (the output value) from the acceleration sensor and the actual acceleration calculated at the differential portion 3e, namely corresponds to acceleration generated by a gravity depending on a road-surface slope.

The estimated-slope torque correcting portion 3k corrects the estimated-slope torque converted at the torque converting portion 3j based on the reliability for the estimated slope calculated at the reliability calculating portion 3h, to thereby calculate an after-correction value of the estimated-slope torque. A method of calculating the after-correction value of the estimated-slope torque will be also explained below more in detail.

The distributing portion 3m decides a distribution of the driving/braking force based on an additional value of the after-correction feedback torque calculated at the feedback-torque correcting portion 3i and the feed-forward torque calculated at the feed-forward control portion 3c. As a result, the demand power-train torque and the demand braking torque are respectively transmitted to the power-train control portion 4 and the brake control portion 5.

The power-train control portion 4 is composed of, for example, a power-train ECU and so on, and outputs a demand value for torque to an engine (a demand engine torque) and a demand value for a gear ratio to an automatic transmission apparatus (a demand gear ratio) depending on the demand power-train torque. The brake control portion 5 is likewise composed of, for example, a brake ECU and so on, and outputs a demand value for a wheel-cylinder pressure (a demand braking pressure) which is generated by a hydraulic braking actuator depending on the demand braking torque. As a result, a driving force and a braking force are generated, each of which depends on the distribution for the driving/braking forces, so that a desired vehicle acceleration can be achieved.

The method of calculating the reliability for the estimated slope (which is calculated at the reliability calculating portion 3h) as well as the methods of correcting the feedback torque and the estimated-slope torque (which are respectively corrected at the correcting portions 3i and 3k) will be explained.

At first, the method of calculating the reliability for the estimated slope at the calculating portion 3h will be explained. As already explained, the reliability of the estimated slope is calculated based on the input data, such as the aged deterioration, the temperature of the acceleration sensor, the onboard condition, and the level of the punishing road. This is because the reliability of the estimated slope varies depending on various parameters, which are identified as the above input data.

Figure 3:
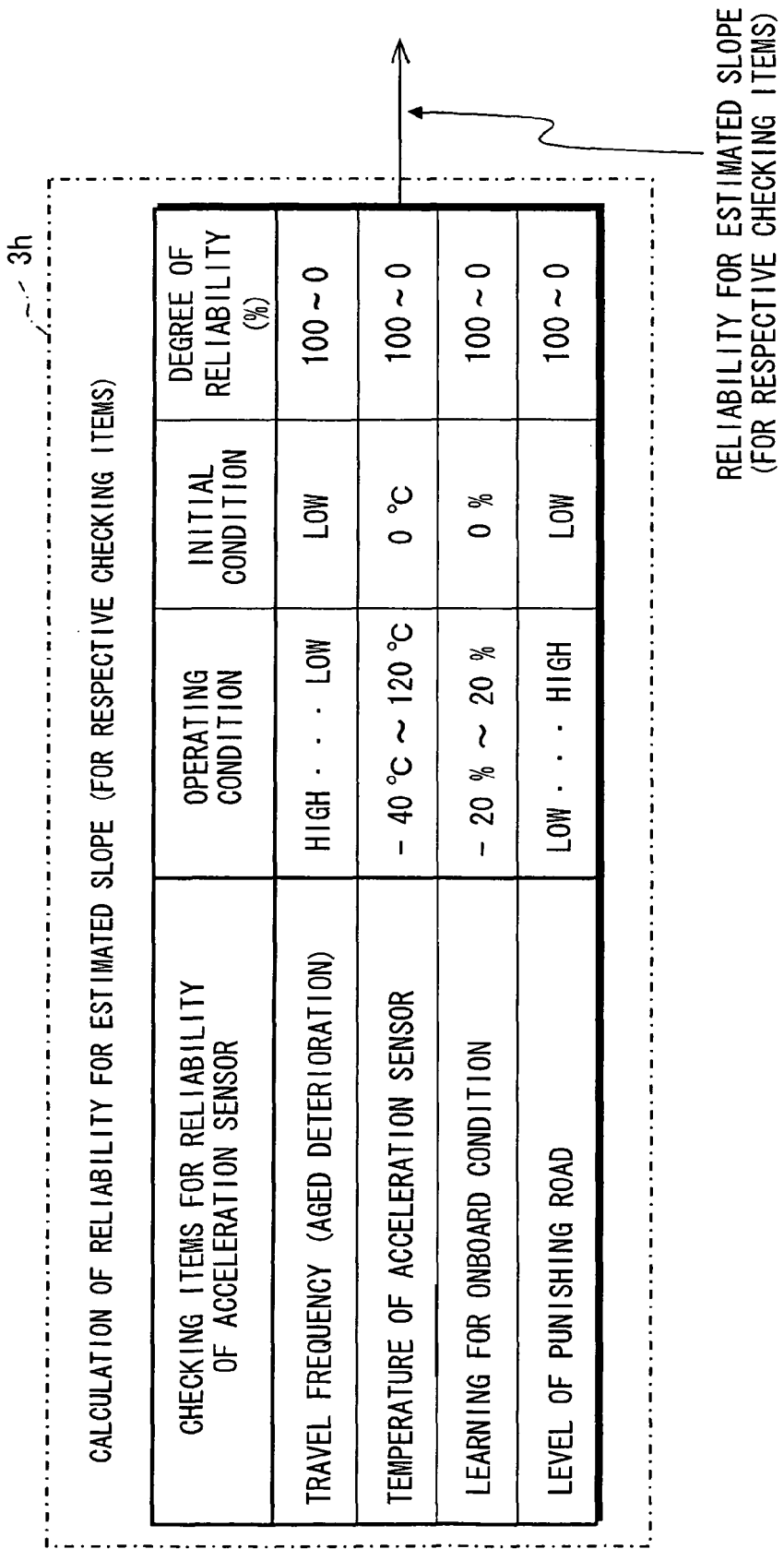
FIG. 3 is a block diagram schematically showing an inside structure of a reliability calculating portion 3h for an estimated slope.

FIG. 3 is a block diagram schematically showing an inside structure of the calculating portion 3h for the reliability. The calculating portion 3h checks disturbance factors affecting the reliability for the estimated slope and obtains a value of the reliability corresponding to such disturbance factors. According to the present embodiment, the calculating portion 3h has a map showing operating conditions, initial values, and degrees of reliability for respective checking items. The calculating portion 3h selects a corresponding degree of reliability for the respective checking items from the map.

As shown in FIG. 3, the checking items include the aged deterioration, the temperature of the acceleration sensor, the onboard condition, and the level of the punishing road.

Figure 4:
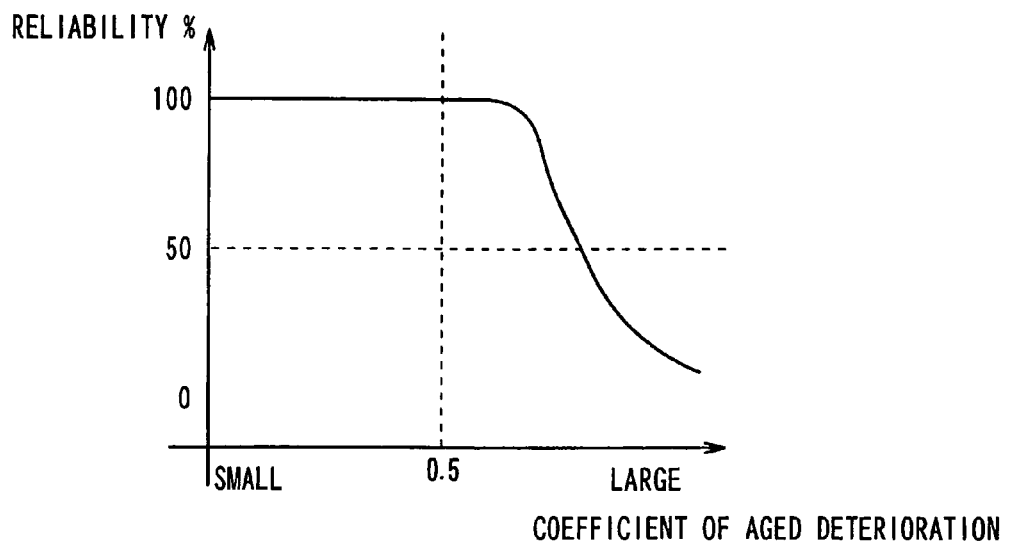
FIG. 4 is a graph showing an example of a relationship between aged deterioration and reliability for the estimated slope.

The reliability for the estimated slope has a certain relationship with the aged deterioration, according to which the reliability will be decreased as the aged deterioration will become larger. FIG. 4 is a graph showing an example of the relationship between the aged deterioration and the reliability for the estimated slope. As shown in FIG. 4, the reliability for the estimated slope is set at 100% when a coefficient of the aged deterioration is in a range of 0 to 0.5, and the reliability for the estimated slope may be set so as to decrease as the coefficient of the aged deterioration becomes larger than 0.5. Although the aged deterioration may be defined by various parameters, in the present embodiment, the coefficient of the aged deterioration may be expressed as in the following mathematical formula.

"Coefficient of aged deterioration"="coefficient of deterioration for power supply"×"power supply time"+"coefficient of deterioration for mileage"× "mileage"+"coefficient of deterioration for elapsed time"×"elapsed time" (Formula 1)

In the above formula, the "coefficient of deterioration for power supply" is a coefficient representing deterioration, which is caused by power supply to the acceleration sensor. The "coefficient of deterioration for mileage" is a coefficient representing deterioration of the acceleration sensor depending on the mileage. And the "coefficient of deterioration for elapsed time" is a coefficient representing deterioration of the acceleration sensor depending on the elapsed time from its brand-new condition. Each of those coefficients differs depending on a type of the acceleration sensor and a position at which the acceleration sensor is mounted in a vehicle. The "power supply time" is a total time period during which the electric power is supplied to the acceleration sensor. For example, the "power supply time" is obtained by calculating/turn-on time periods of an ignition switch. The "mileage" can be obtained by receiving data for mileage of an odometer from the meter ECU. The "elapsed time" can be obtained in a way that an elapsed time from its manufacturing time point is estimated and an elapsed time from a very beginning of starting a car navigation system for the first time is measured, and the "elapsed time" is calculated based on such data.

For example, the "coefficient of deterioration for power supply" is set at "0.1", the "coefficient of deterioration for mileage" is set at "0.05", and the "coefficient of deterioration for elapsed time" is set at "0.02". For the "power supply time", 1,000 H is converted into "1". For the "mileage", 10,000 km is converted into "1". And for the "elapsed time", one year is converted into "1".

Therefore, in case of 1,000 H for the "power supply time", 50,000 km for the "mileage", and five years for the "elapsed time", the "coefficient of aged deterioration" will be calculated as "0.45" (=0.1×1+0.05×5+0.02×5). In this case (the coefficient of the aged deterioration is less than "0.5"), the degree of the reliability for the aged deterioration is 100%.

With regard to the temperature of the acceleration sensor, the reliability of the estimated slope is high around room temperature, while the reliability of the estimated slope becomes lower as the temperature becomes higher or lower than the room temperature. According to the present embodiment, the initial value is set at "0° C." and the reliability of the estimated slope is selected from a range of 100 to 0% depending on the temperature of the acceleration sensor.

Figure 5:
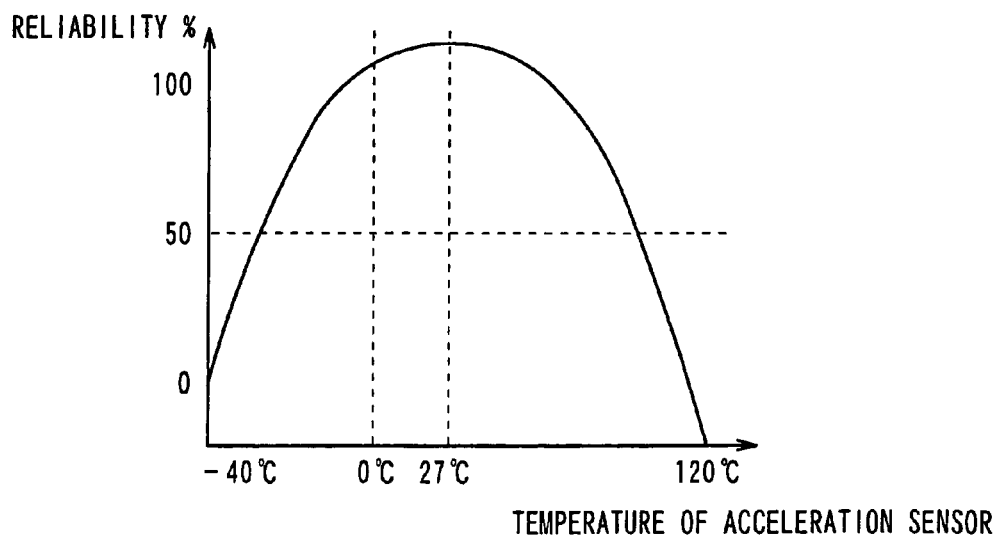
FIG. 5 is a graph showing an example of a relationship between temperature of an acceleration sensor and reliability for the estimated slope.

FIG. 5 is a graph showing an example of the relationship between the temperature of the acceleration sensor and the reliability of the estimated slope. As shown in FIG. 5, a range of the temperature of a vehicle environment (more exactly, a place for mounting the acceleration sensor) is set between −40° C. and 120° C., the reliability of the estimated slope is set at 100% at the room temperature (for example, at 27° C.), and the reliability of the estimated slope is gradually decreased when the temperature becomes higher or lower than the room temperature. The relationship between the temperature of the acceleration sensor and the reliability of the estimated slope may be obtained by searching in advance temperature characteristics of the acceleration sensor through experiments.

With regard to the onboard condition (e.g. laden weight), the reliability of the estimated slope is changed depending on a condition of learning for the onboard condition. The reliability of the estimated slope becomes higher, as the learning condition is higher. According to the present embodiment, the initial value for the reliability of the estimated slope is set at "0%" and the reliability is linearly increased to 100% depending on the learning condition.

Figure 6:
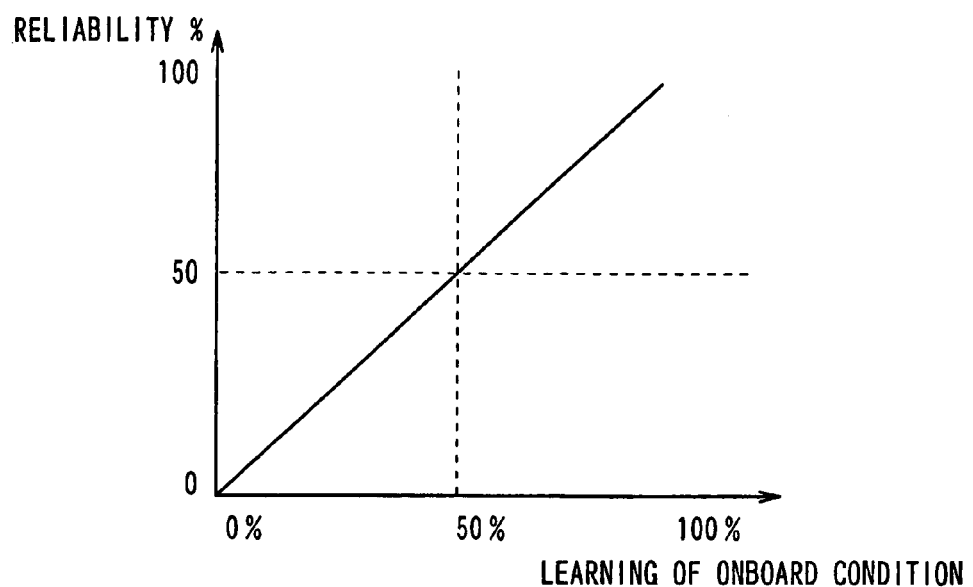
FIG. 6 is a graph showing an example of a relationship between learning degree for onboard condition (e.g. laden weight) and reliability for the estimated slope.

FIG. 6 is a graph showing an example of the relationship between the learning condition for the onboard condition and the reliability of the estimated slope. As shown in FIG. 6, the reliability of the estimated slope is increased in proportion to the learning condition of the onboard condition. The learning of the onboard condition is carried out each time when the ignition switch is turned on, and the onboard condition (e.g. laden weight) is calculated based on a detected signal from the vehicle height sensor or on a relationship between engine torque and actual acceleration, wherein a time from starting vehicle traveling is used as a parameter. Likelihood for the onboard condition, in which the lapsed time from the vehicle traveling is taken into account, is indicated as a degree of the learning condition. However, since such a method is well known in the art, the further explanation is omitted.

With regard to the level of the punishing road, the reliability of the estimated slope is decreased as the level of the punishing road becomes higher. This is because the vehicle wheels may be lifted up due to the bumpy road. According to the present embodiment, the initial value for the level of the punishing road is set at "low" and the reliability of the estimated slope is set at "100%". And the reliability is linearly decreased from 100% to 0% depending on the level of the punishing road.

Figure 7:
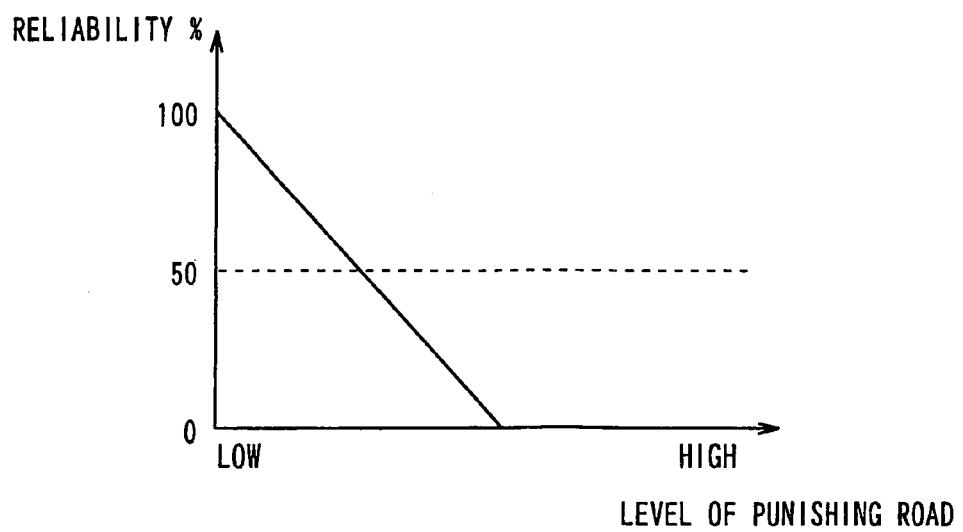
FIG. 7 is a graph showing an example of a relationship between a level of a punishing road and reliability for, the estimated slope.

FIG. 7 is a graph showing an example of the relationship between the level of the punishing road and the reliability of the estimated slope. As shown in FIG. 7, the reliability of the estimated slope is linearly decreased as the level of the punishing road becomes higher.

As above, in the reliability calculating portion 3h, the reliability of the estimated slope is calculated for the respective checking items, which are variable factors to the reliability of the estimated slope. Then, the reliabilities of the estimated slope for the respective checking items are transmitted to the correcting portion 3i for the feedback torque and to the correcting portion 3k for the estimated-slope torque.

Now, a correcting method for the feedback torque at the correcting portion 3i will be explained. As already explained, the feed-forward control portion 3c calculates the feed-forward torque by adding the estimated-slope torque (after correction) to the demand axle torque. Therefore, if the accuracy for the estimated-slope torque would be decreased, the accuracy for the feed-forward torque would be correspondingly decreased. According to the present embodiment, the correcting portion 3i for the feedback torque corrects the feedback torque based on the reliabilities of the estimated slope calculated at the reliability calculating portion 3h, in order to compensate the decrease of the accuracy for the feed-forward toque. As a result, the decrease of the accuracy for the acceleration control portion 3 is totally suppressed.

Figure 8:
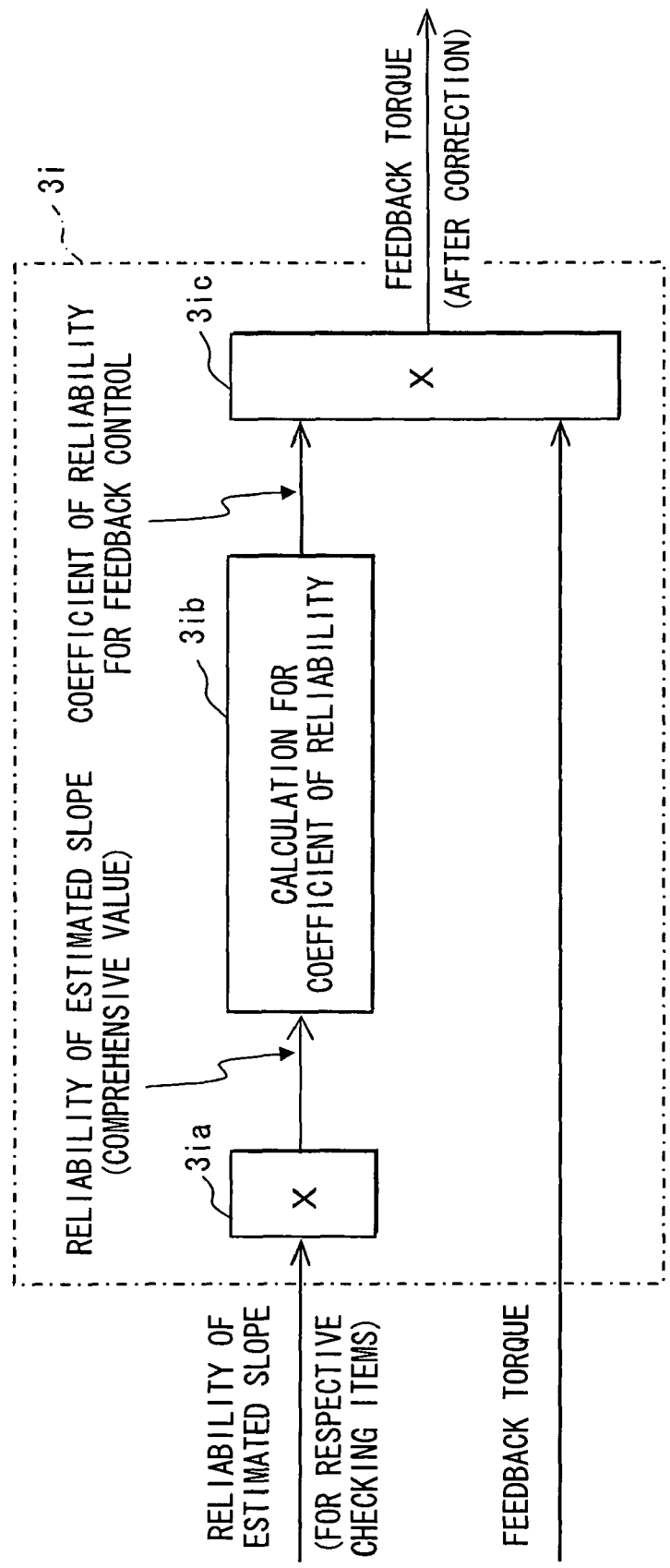
FIG. 8 is a block diagram schematically showing an inside structure of a feedback-torque correcting portion 3i.

FIG. 8 is a block diagram schematically showing an inside structure of the correcting portion 3i for the feedback torque. As shown in FIG. 8, the correcting portion 3i is composed of a multiplying portion 3ia, a calculating portion 3ib for calculating a coefficient of the reliability for the feedback control, and a multiplying portion 3ic.

The multiplying portion 3ia multiplies the respective reliabilities of the estimated slope for each checking item (which are calculated at the reliability calculating portion 3h), with each other so as to calculate a comprehensive reliability of the estimated slope, in which the reliability for each checking item is taken into account.

The calculating portion 3ib calculates the coefficient of the reliability for the feedback control based on the comprehensive reliability of the estimated slope. The coefficient of the reliability for the feedback control corresponds to a weighting amount for correcting the feedback torque depending on the reliability of the estimated slope. A relationship between the coefficient of the reliability for the feedback control and the reliability of the estimated slope is in advance stored as a map or a function expression (by four arithmetic operations), based on which the coefficient of the reliability for the feedback control is calculated. The map or the function expression may be obtained in advance through simulation or actual vehicle travel. Since the coefficient of the reliability for the feedback control can be obtained based on the map or the function expression, the feedback torque can be adequately corrected.

Figure 9:
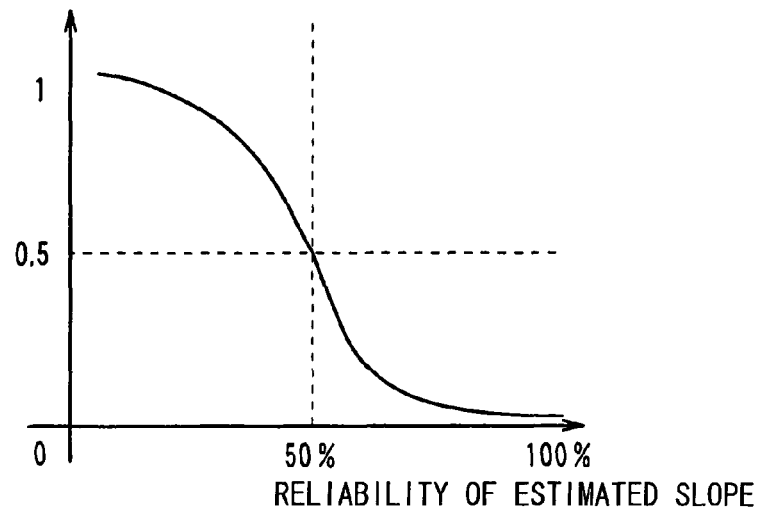
FIG. 9 is a graph showing an example of a relationship between coefficient of reliability for the feedback control and reliability for the estimated slope.

FIG. 9 is a graph (map) showing an example of the relationship between the coefficient of the reliability for the feedback control and the reliability of the estimated slope. As shown in FIG. 9, when the reliability of the estimated slope is 100%, the coefficient of the reliability for the feedback control becomes to its minimum value, while the coefficient of the reliability for the feedback control is gradually increased as the reliability of the estimated slope becomes smaller than 100%. The coefficient of the reliability for the feedback control may be set at a value of "0.5" when the reliability of the estimated slope is 50%. The coefficient of the reliability for the feedback control may be further increased to come closer to 1.0 when the reliability of the estimated slope becomes lower than 50%.

The coefficient of the reliability for the feedback control may be alternatively obtained based on a ratio between an absolute figure of the demand axle torque calculated for the feed-forward control and an absolute figure of the estimated-slope torque (after correction), in addition to the reliability of the estimated slope. Accordingly, the coefficient of the reliability for the feedback control can be set at an optimum value, based on not only degree of incidence but also the reliability for the estimated-slope torque.

For example, the relationship between the coefficient of the reliability for the feedback control and the reliability of the estimated slope may be so set that the coefficient of the reliability for the feedback control becomes to its minimum value when the reliability of the estimated slope is 100%, while the coefficient of the reliability for the feedback control is gradually increased as the reliability of the estimated slope becomes smaller than 100%, as in the same manner to that of FIG. 9. In addition, multiple maps are prepared, in which the relationships between the coefficient of the reliability for the feedback control and the reliability of the estimated slope are different from each other. And one of the maps may be selected based on the demand axle torque calculated for the feed-forward control and the estimated-slope torque (after correction), more exactly based on the ratio of the absolute figures for those demand axle torque and the estimated-slope torque. Thus, the coefficient of the reliability for the feedback control may be corrected by such selected map.

Figure 10:
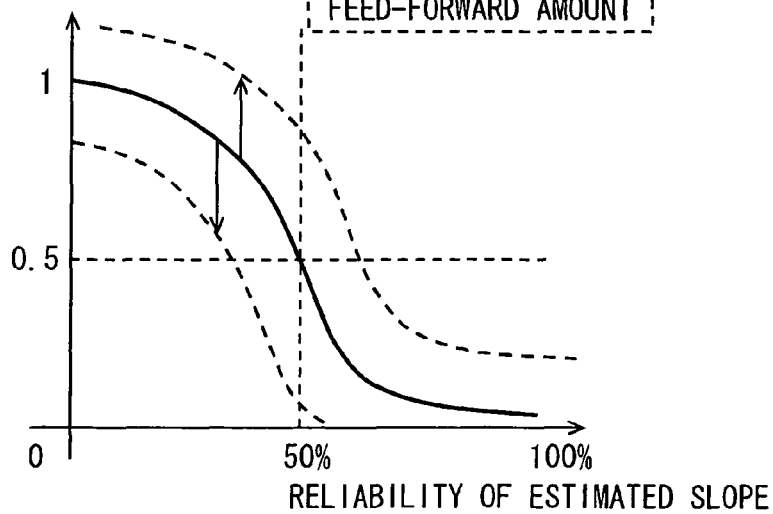
FIG. 10 is a graph showing another example of a relationship between coefficient of reliability for the feedback control and reliability for the estimated slope, wherein the coefficient of reliability for the feedback control is obtained depending on not only the reliability for the estimated slope but also a feed-forward amount.

According to an example shown in FIG. 10, the ratio between the absolute figure of the demand axle torque calculated for the feed-forward control and the absolute figure of the estimated-slope torque (after correction) is calculated when the vehicle is traveling at a constant speed on a flat road. Such ratio is set as a reference value. And the map indicated by a solid line in FIG. 10 is selected when the calculated ratio is within a predetermined range from the reference value.

When the inclination of the road surface becomes larger, the calculated ratio between the absolute figure of the demand axle torque and the absolute figure of the estimated-slope torque (after correction) may become larger than the reference value by the predetermined range. In such a case, the map indicated by a dotted line in FIG. 10, which is plotted above the solid line, is selected. As understood from FIG. 10, the coefficient of the reliability for the feedback control with respect to the reliability of the estimated slope, that is, a value of the dotted line, is set at a higher value than that of the solid line.

On the other hand, for example, when the vehicle operating condition is changed from the constant-speed traveling to an accelerating mode, the calculated ratio between the absolute figure of the demand axle torque and the absolute figure of the estimated-slope torque (after correction) becomes smaller than the reference value by the predetermined range. In such a case, the map indicated by another dotted line in FIG. 10, which is plotted below the solid line, is selected. Namely, the coefficient of the reliability for the feedback control with respect to the reliability of the estimated slope, that is a value of the dotted line, is set at a lower value than that of the solid line.

Figure 11:
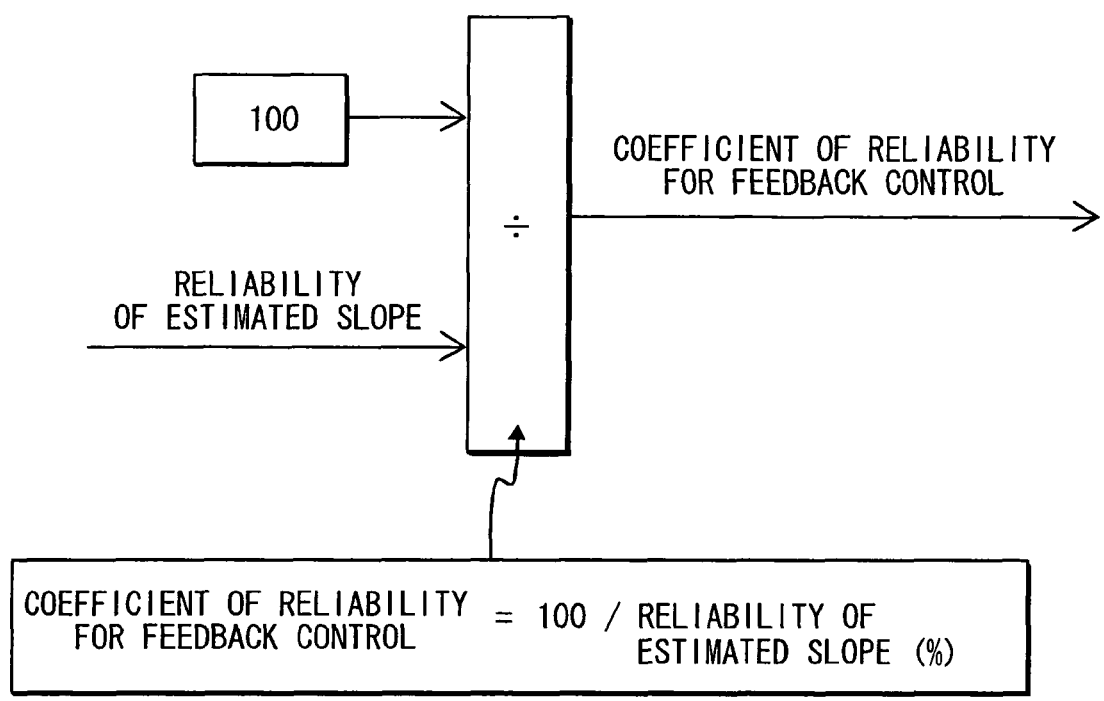
FIG. 11 is a block diagram showing a method for calculating (by four arithmetic operations) the coefficient of the reliability for the feedback control based on the reliability of the estimated slope.

FIG. 11 is a block diagram showing a method for calculating (by four arithmetic operations) the coefficient of the reliability for the feedback control based on the reliability of the estimated slope. As shown in the drawing, when the four arithmetic operations are applied, the coefficient of the reliability for the feedback control can be obtained by calculating a multiplicative inverse for the reliability of the estimated slope (=100/the reliability of the estimated slope (%)).

In a similar manner to the method explained with reference to FIG. 10, the coefficient of the reliability for the feedback control may be likewise obtained based on the ratio between the absolute figure of the demand axle torque calculated for the feed-forward control and the absolute figure of the estimated-slope torque (after correction), in addition to the reliability of the estimated slope. As a result, the coefficient of the reliability for the feedback control can be set at an optimum value, based on not only the degree of incidence but also the reliability for the estimated-slope torque.

Figure 12:
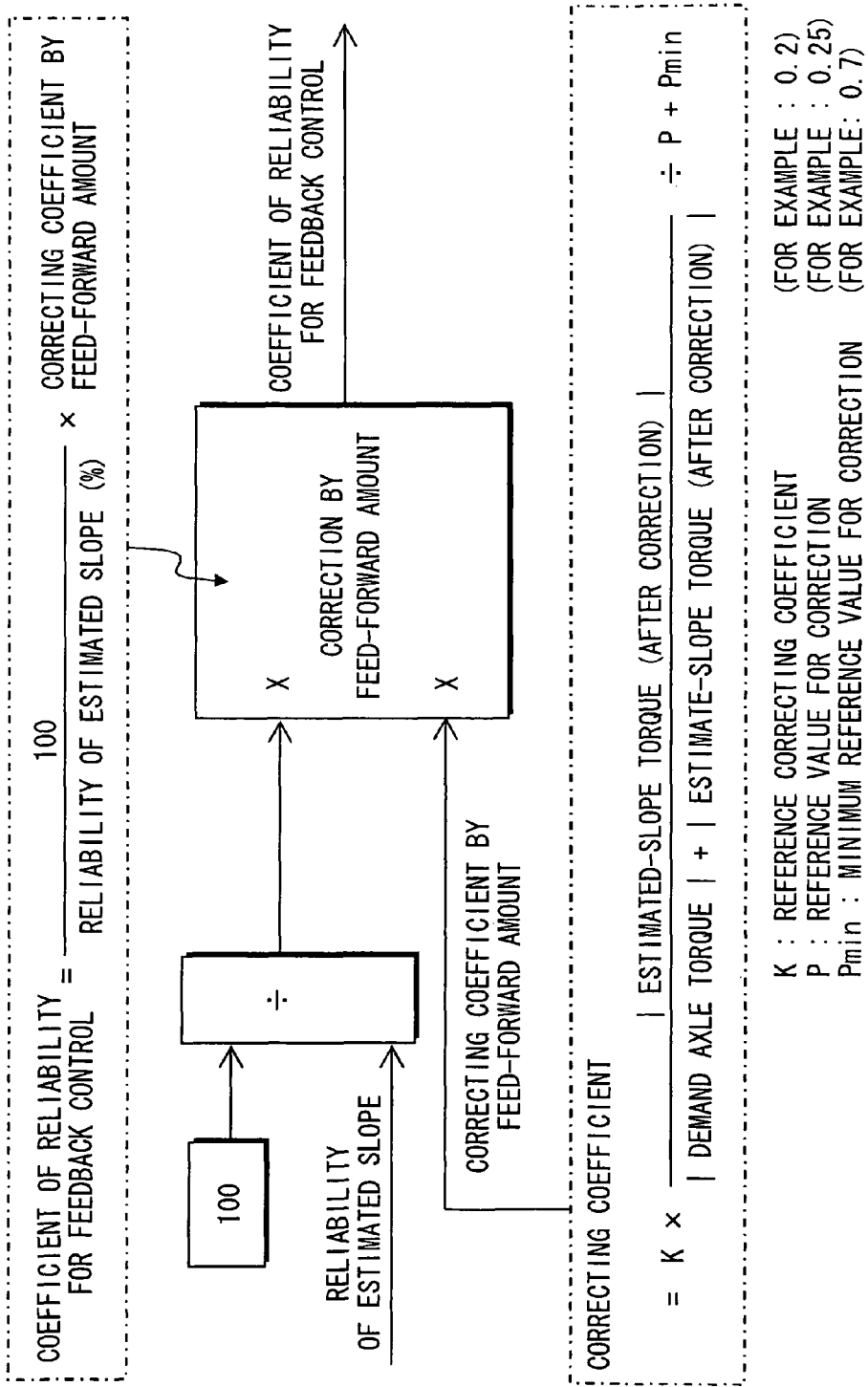
FIG. 12 is a block diagram showing another method for calculating (by four arithmetic operations) the coefficient of the reliability for the feedback control based on the reliability of the estimated slope, wherein the coefficient of the reliability for the feedback control is corrected by a correcting coefficient for the feed-forward control amount.

For example, as shown in FIG. 12, a correcting coefficient may be calculated based on a reference correcting coefficient "K", a reference value "P" for correction, the demand axle torque, and the estimated-slope torque (after correction), in accordance with a following mathematical formula 2. Then, the coefficient of the reliability for the feedback control can be obtained by multiplying the multiplicative inverse for the reliability of the estimated slope (=100/the reliability of the estimated slope (%)) by the correcting coefficient.

"Correcting coefficient"="K"×{|estimated-slope torque (after correction)|/(|demand axle torque|+ |estimated-slope torque (after correction)|)/"P"}+ "Minimum reference value for correction" (Formula 2)

In the above formula 2, "K" is the reference correcting coefficient and "P" is the reference value for correction, both of which may be set at respective optimum values through traveling tests and/or simulations.

In a case that the reference correcting coefficient "K" is set at "0.2", the reference value "P" for correction is set at "0.25", the demand axle torque is "2000 Nm", and the vehicle is traveling on a gentle slope wherein the estimated-slope torque (after correction) is "200 Nm", the correcting coefficient can be calculated as below in accordance with the above formula 2; namely "0.78"="0.2"×{"200"/"2000"/"0.25"}+"0.7".

When the vehicle is traveling on a steep slope wherein the estimated-slope torque correction) is "1000 Nm", the correcting coefficient can be calculated as below:

"1.5"="0.2"×{"1000"/"2000"/"0.25"}+"0.7"

As above, the correcting coefficient is calculated in accordance with the formula 2, and the calculated correcting coefficient is multiplied by the multiplicative inverse for the reliability of the estimated slope to obtain the coefficient of reliability for the feedback control. As a result, the coefficient of reliability for the feedback control becomes larger, when the ratio of the absolute figure for the estimated-slope torque (after correction) against the absolute figure for the demand axle torque becomes larger.

The correcting coefficient for the coefficient of reliability for the feedback control may be alternatively obtained in the following manner. The correcting coefficients are calculated in accordance with the above formula for respective ratios of the absolute figure for the estimated-slope torque (after correction) against the absolute figure for the demand axle torque. Such calculated multiple correcting coefficients are memorized in advance as maps for the correcting coefficient. And the correcting coefficient for the coefficient of reliability for the feedback control may be selected from the map for the correcting coefficient, depending on the ratio of the absolute figure for the estimated-slope torque (after correction) with respect to the absolute figure for the demand axle torque.

The method for obtaining the coefficient of reliability for the feedback control is not limited to that shown in FIG. 12, in which the coefficient of reliability is calculated (corrected) by use of the four arithmetic operations. The coefficient of reliability for the feedback control may be alternatively obtained from a map, which shows a relationship between the coefficient of reliability for the feedback control and the reliability of the estimated slope, as in a similar manner to that shown in FIG. 9.

As above, the coefficient of the reliability for the feedback control is designed to become larger as the reliability of the estimated slope becomes lower.

The multiplying portion 3*ic* multiplies the feedback torque calculated at the feedback control portion 3*f* and the torque converting portion 3*g* by the coefficient of the reliability for the feedback control calculated at the calculating portion 3*ib*, so as to correct the feedback torque. Since the coefficient of the reliability for the feedback control corresponds to the weighting amount for correcting the feedback torque depending on the reliability of the estimated slope, a degree of correction for the feedback torque becomes larger as the reliability of the estimated slope becomes lower. On the other hand, the degree of correction for the feedback torque becomes smaller as the reliability of the estimated slope becomes higher. As a result, a gain for the feedback control portion 3*f* can be increased in accordance with the decrease of the reliability of the estimated slope, so that the feedback torque (after correction) can be calculated depending on the reliability of the estimated slope.

Now, a correcting method, for the estimated-slope torque at the correcting portion 3*k* will be explained. As already explained, the torque converting portion 3*j* converts the acceleration for the estimated slope (that is, the acceleration depending on the estimated slope) into the torque, to thereby calculate the estimated-slope torque. The acceleration for the estimated slope has an accuracy corresponding to the reliability of the estimated slope. Therefore, the estimated-slope torque converted from the acceleration for the estimated slope is not used as it is, but the estimated-slope torque is corrected depending on the reliability of the estimated slope. More exactly, an absolute value of the estimated-slope torque is made smaller in accordance with the decrease of the reliability of the estimated slope, so that a ratio of involvement of the estimated-slope torque may be made smaller to decrease influence of an error for the estimated slope. As a result, decrease of the accuracy for the feed-forward torque is suppressed.

Figure 13:
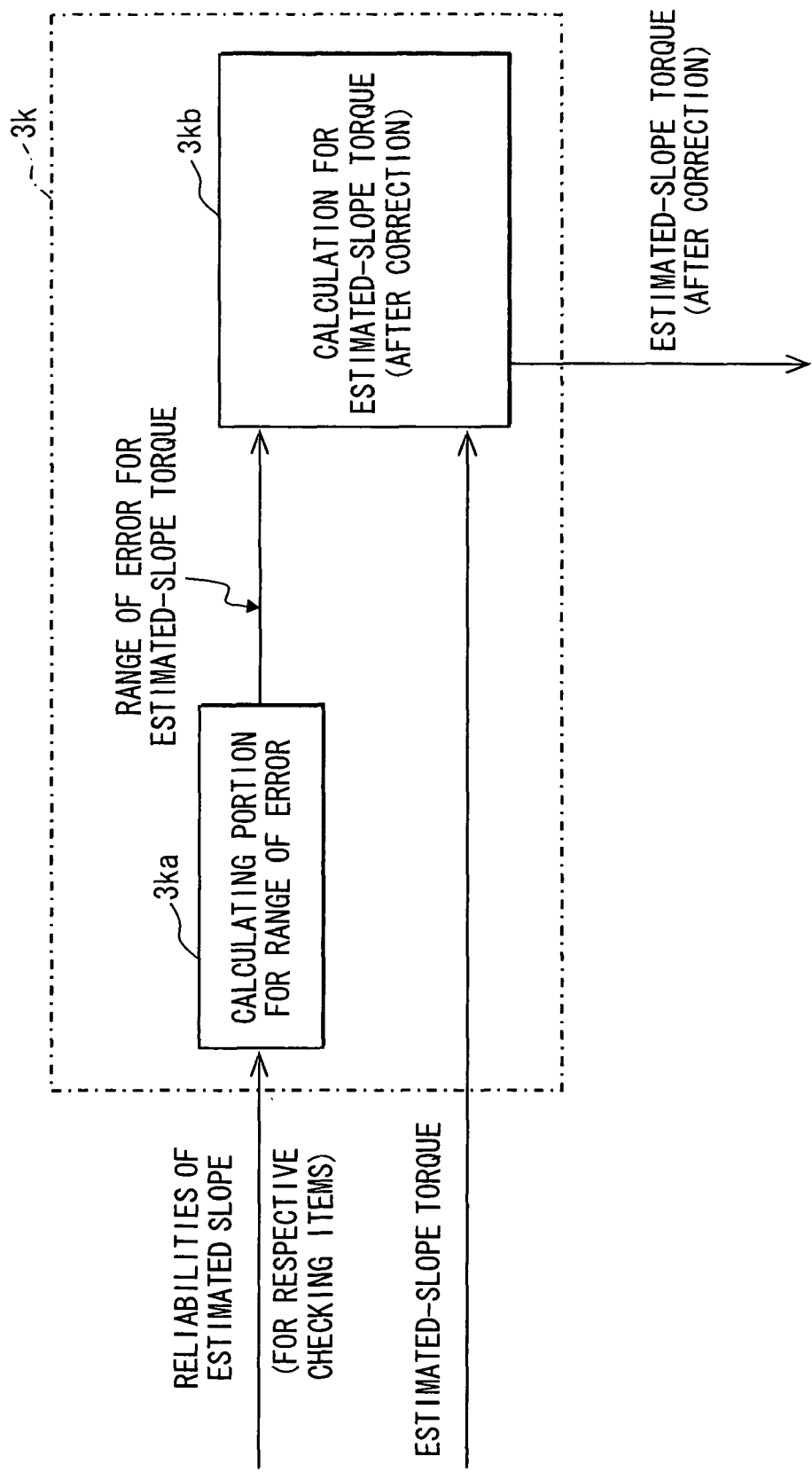
FIG. 13 is a block diagram schematically showing an inside structure of a correcting portion 3k for estimated-slope torque.

FIG. 13 is a block diagram schematically showing an inside structure of the correcting portion 3*k* for the estimated-slope torque. As shown in FIG. 13, the correcting portion 3*k* is composed of a calculating portion 3*ka* for calculating a range of error and a calculating portion 3*kb* for calculating the estimated-slope torque (after correction). In other words, the calculating portion 3*kb* corrects the estimated-slope torque based on the range of error from the calculating portion 3*ka*.

The calculating portion 3*ka* calculates the range of error for the respective checking items, based on the reliability for the estimated slope for the respective checking items calculated at the reliability calculating portion 3*h*. Furthermore, the calculating portion 3*ka* adds the respective ranges of error for all of the checking items, to thereby calculate a comprehensive range of the error. The range of the error means an allowable range for the error of the estimated-slope torque, which is in advance investigated for the respective checking items through experiments. Therefore, when the estimated-slope torque has an error within the range of error (that is, the allowable range), it is not necessary to correct the estimated-slope torque.

The reliability of the estimated slope is calculated for each of the checking items. The allowable range of the error for the estimated-slope torque differs from checking item to checking item. The calculating portion 3*ka* calculates the ranges of the error for the respective checking items, to thereby calculate the allowable range of the error, which is estimated for the respective checking items. The calculating portion 3*ka* adds all of the ranges of the error, to thereby calculate a range of a total error for the estimated-slope torque, in which all of the checking items are taken into account. And a dead zone is set, in which the estimated-slope torque is not corrected when the total errors are within the allowable range. On the other hand, when the total errors are out of the allowable range, the estimated-slope torque is corrected. As above, as a result that the estimated-slope torque is corrected depending on the range of the error, it is possible to decide a range in which the estimated-slope torque will be made smaller. Therefore, it is possible to correct the estimated-slope torque with an adequate amount.

Figures 14A, 14B:
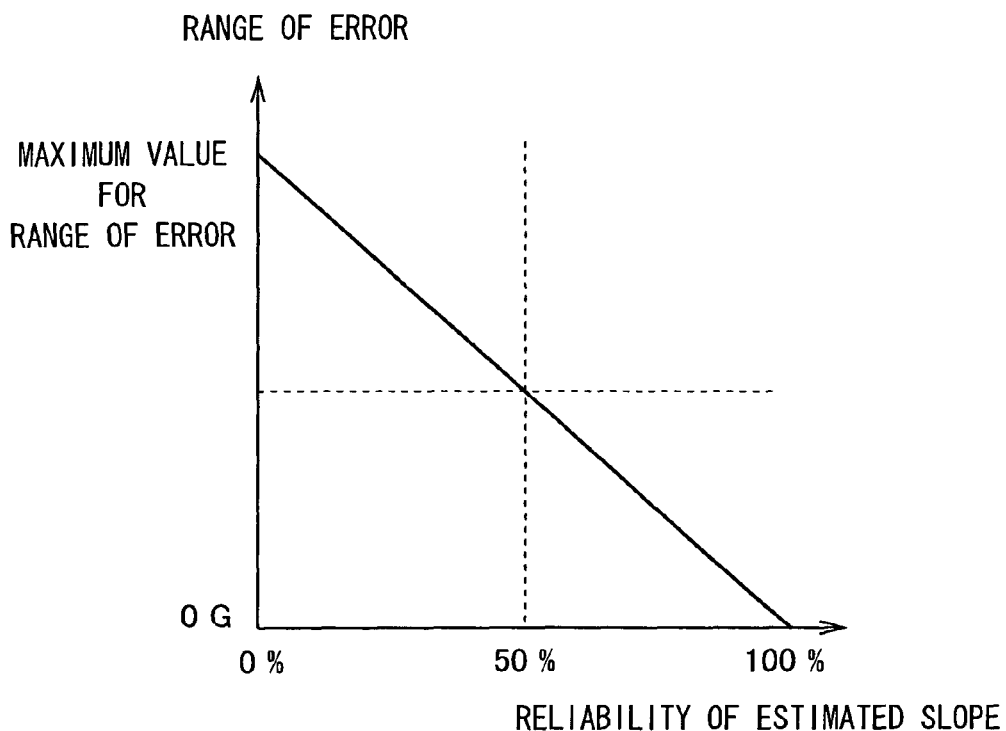
FIG. 14A is a graph showing an example of a relationship between a range of error and the reliability of the estimated slope.
FIG. 14B is a table showing a maximum value for the range of error for respective checking items.

FIG. 14A is a graph showing an example of a relationship between the range of error and the reliability of the estimated slope, wherein the relationship is applied to calculation of the range of error for the respective checking items. FIG. 14B is a table showing a maximum value for the range of error for the respective checking items.

As shown in FIG. 14A, a maximum value for the range of error is set when the reliability of the estimated slope is 0%. The range of error is set at zero "0" when the reliability of the estimated slope is 100%. The range of error is increased to the maximum value, as the reliability of the estimated slope becomes lower. Each of the maximum values in the table of FIG. 14B is applied to the maximum value for the range of error in the graph of FIG. 14A, so that the range of error is selected corresponding to the reliability of the estimated slope calculated at the reliability calculating portion 3*h* for the respective checking items. For example, in a case that the reliability of the estimated slope for the aged deterioration is 20%, the range of error for the aged deterioration is calculated in the following manner:

the range of error for the aged deterioration=0.1 G
(the maximum value)×(1−20%/100%)=0.08 G The range of error for each checking item is calculated in a similar manner to the above method for the aged deterioration and a sum of the respective ranges for error is calculated. For example, the sum of the ranges for error will be "0.13 G", when the ranges of error for the respective checking items are as below;
(1) "0.08 G" in a case that the reliability of the estimated slope for the aged deterioration is 20%,
(2) "0.05 G" in a case that the reliability of the estimated slope for the temperature of the acceleration sensor is 0%,
(3) "0.00 G" in a case that the reliability of the estimated slope for the learning of the onboard condition is 100%, and
(4) "0.00 G" in a case that the reliability of the estimated slope for the level of the punishing road is 0%.

The above sum "0.13 G" corresponds to the comprehensive range of error, in which all of the ranges of error for the respective checking items are taken into account.

The calculating portion 3*kb* calculates the estimated-slope torque (after correction) based on the comprehensive range of error calculated at the calculating portion 3*ka*. For example, the estimated-slope torque (after correction) is calculated in the following mathematical formula:

"the estimated-slope torque (after correction)"="the estimated-slope torque"−"the range of error"
(only if |the estimated-slope torque|≧|the range of error|) (Formula 3)

The above calculation is carried out only in a case, in which an absolute figure of "the estimated-slope torque" is larger than an absolute figure of "the range of error". In addition, a positive sign or a negative sign is selected depending on the uphill or downhill road, so that the sign for the estimated-slope torque corresponds to the positive or negative sign for the acceleration. The same sign to the estimated-slope torque is given to the range of error. The estimated-slope torque (after correction) is made "zero", when the absolute figure of "the estimated-slope torque" is smaller than the absolute figure of "the range of error".

Figure 15A:
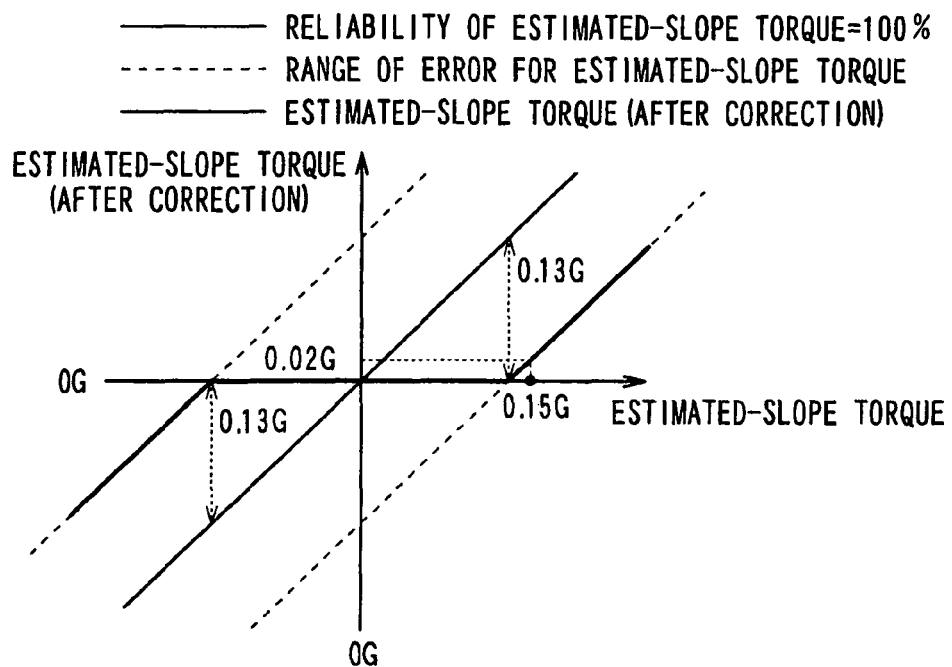
FIGS. 15A and 15B are graphs, each showing a relationship between estimated-slope torque (after correction) and estimated-slope torque (before correction), in cases that the reliability of the estimated slope is low (the range of error is 0.13 G) and the reliability of the estimated slope is high (the range of error is 0.01 G)
Figure 15B:
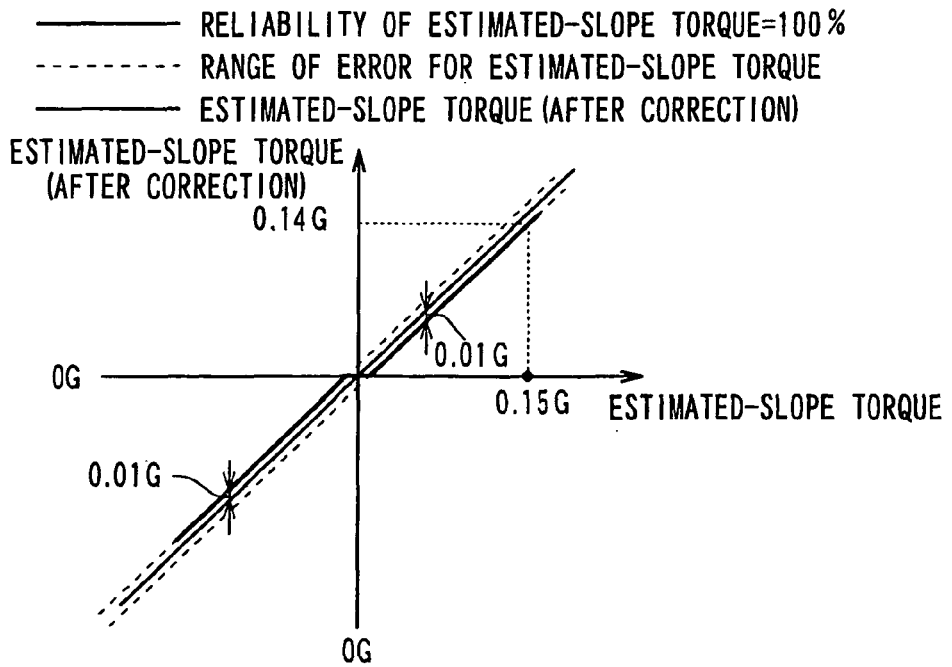

An example for calculating the estimated-slope torque (after correction) will be further explained with reference to FIGS. 15A and 15B. Each of FIGS. 15A and 15B is a graph showing a relationship between the estimated-slope torque (after correction) and the estimated-slope torque, in cases that the reliability of the estimated slope is low (the range of error is 0.13 G: FIG. 15A) and the reliability of the estimated slope is high (the range of error is 0.01 G: FIG. 15B).

As shown in FIG. 15A, when the reliability of the estimated slope is low (the range of error is 0.13 G, for example), the allowable range for which the correction for the estimated-slope torque may not be carried out will be wider. For example, in a case that the estimated-slope torque from the torque converting portion 3*j* is "0.15 G", the range of error "0.13 G" is subtracted from "0.15 G". As a result, the estimated-slope torque (after correction) will be "0.02 G".

On the other hand, as shown in FIG. 15B, when the reliability of the estimated slope is high (the range of error is 0.01 G, for example), the allowable range for which the correction for the estimated-slope torque may not be carried out will be smaller. Therefore, in a case that the estimated slope torque from the torque converting portion 3*j* is "0.15 G", the range of error "0.01 G" is subtracted from "0.15 G". As a result, the estimated-slope torque (after correction) will be "0.14 G".

As above, when the reliability of the estimated slope is low, a smaller value is calculated as the estimated-slope torque (after correction), even if a larger value is inputted to the correcting portion 3*k* from the torque converting portion 3*j* as the estimated-slope torque. This is because the range of error is large and the estimated-slope torque is corrected by such large range of error. On the other hand, when the reliability of the estimated slope is high, the estimated-slope torque from the torque converting portion 3*j* is not largely corrected in order to calculate the estimated-slope torque (after correction). This is because the range of error for the estimated-slope torque is small.

As above, the estimated-slope torque (after correction) is calculated, in which the reliability of the estimated slope is taken into account. Then, the feed-forward control portion 3*c* calculates the feed-forward torque based on the above estimated-slope torque (after correction), in the following formula:

"the feed-forward torque"="the demand axle torque"−
"the estimated-slope torque (after correction)" (Formula 4)

According to the above explained vehicle control system, the adjusting portion 2 outputs the demand value for the applied acceleration and the limiting value for the demand jerk, depending on the demand signals for the acceleration from the acceleration demanding portion 1. The acceleration control portion 3 carries out the feed-forward control to the demand axle torque as well as the feedback control based on the applied acceleration and the limiting value for the demand jerk, to thereby calculate the demand power-train torque as well as the demand braking torque.

The power-train control portion 4 outputs, based on the demand power-train torque, the demand engine torque to the engine and the demand gear ratio to the automatic transmission device, so that the engine output as well as the transmission ratio is controlled.

The brake control portion 5 outputs, based on the demand braking torque, the demand value for the wheel-cylinder pressure (the demand braking pressure) which is generated by the hydraulic braking actuator.

As above, the driving force and the braking force are generated depending on the distribution of the driving-braking force, so that the desired acceleration for the vehicle is achieved.

The following effects may be obtained in the vehicle control system according to the above first embodiment.

In the vehicle control system of the above embodiment, the reliability of the estimated slope is calculated and the feedback torque is corrected depending on the reliability of the estimated slope. It is possible to increase the gain for the feedback control portion 3f when the reliability of the estimated slope is low, so that the feedback torque (after correction) can be calculated depending on the reliability of the estimated slope.

When the reliability of the estimated-slope torque is decreased, the accuracy for the feed-forward torque is correspondingly decreased. However, according to the present embodiment, it is possible to compensate the decrease of the accuracy for the feed-forward torque by calculating the feedback torque depending on the reliability of the estimated slope. In other words, it is possible to comprehensively suppress the decrease of the accuracy for the feed-forward control, even when the accuracy for calculating the estimated-slope torque is decreased.

The acceleration for the estimated slope is a physical value corresponding to the estimated slope. According to the above embodiment, the estimated-slope torque, which is converted from the acceleration for the estimated slope, is corrected depending on the reliability of the estimated slope. And the feed-forward torque is calculated based on the estimated-slope torque (after correction). Namely, the estimated-slope torque, which is converted from the acceleration for the estimated slope, is not directly used but corrected depending on the reliability of the estimated slope. It is, therefore, possible to prevent the decrease of the accuracy for the feed-forward torque.

Second Embodiment

A second embodiment of the present invention will be explained. According to the second embodiment, the method for correcting the feedback torque at the feedback-torque correcting portion 3i is modified, when compared with the first embodiment. Since the other portions are the same to those of the first embodiment, the explanation will be made to those portions which are different from the first embodiment.

Figure 16:
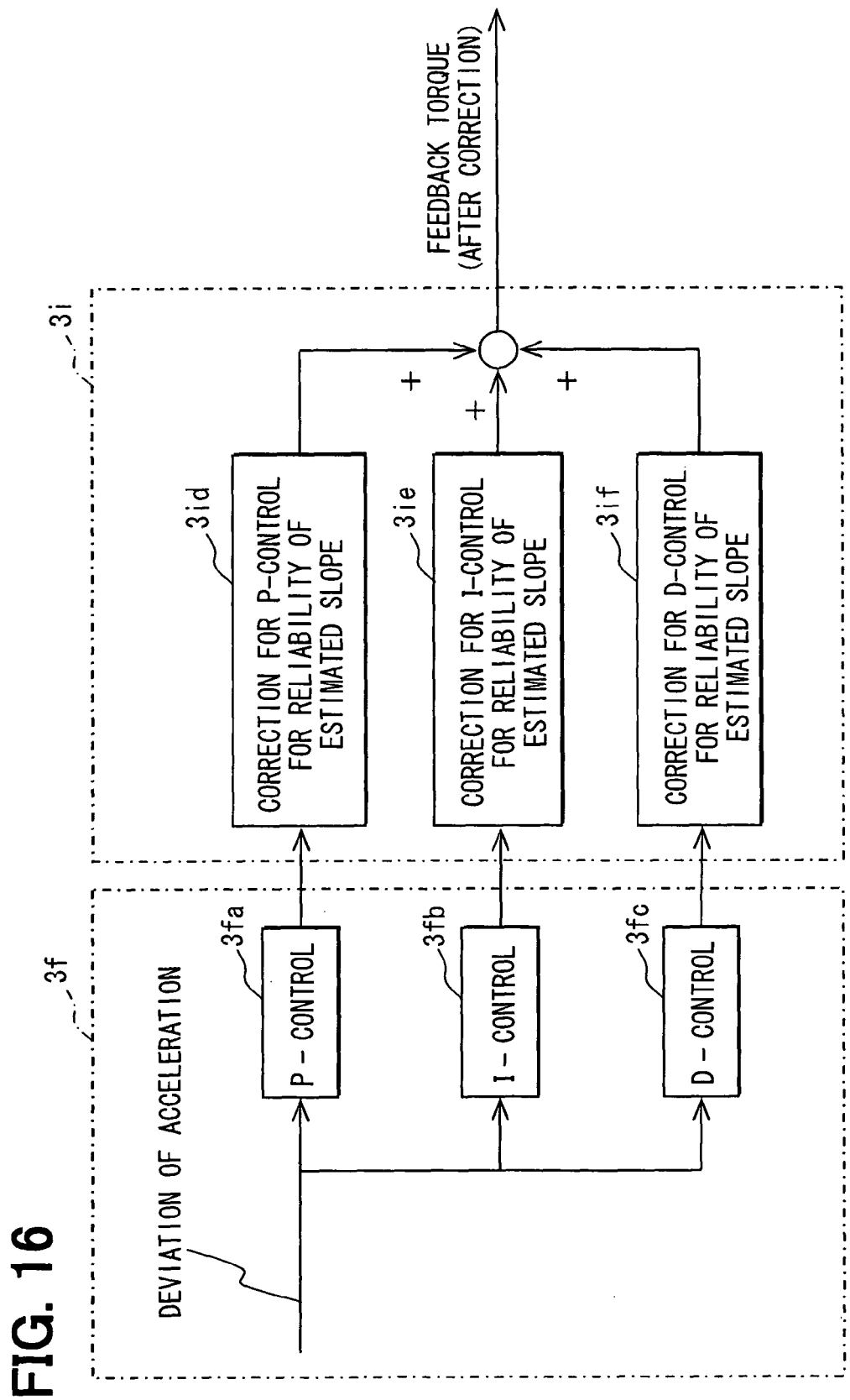
FIG. 16 is a block diagram schematically showing an inside structure of a feedback control portion 3f and a feedback-torque correcting portion 3i of a vehicle driving-braking control system according to a second embodiment of the present invention.

FIG. 16 is a block diagram schematically showing an inside structure of a feedback control portion 3f and a feedback-torque correcting portion 3i of a vehicle driving-braking control system according to the second embodiment. Although a torque converting portion (corresponding to the torque converting portion 3g of the first embodiment) is not shown in FIG. 16, the torque converting portion may be provided between the feedback control portion 3f and the feedback-torque correcting portion 3i so that the output from the feedback control portion 3f may be converted into a torque. Alternatively, the torque converting portion may be provided at a subsequent stage of the feedback-torque correcting portion 3i so that the acceleration for the feedback control (before torque conversion) may be corrected at the feedback-torque correcting portion 3i and such corrected acceleration may be converted into the torque.

As shown in FIG. 16, the feedback control portion 3f carries out the feedback control by the PID control. Namely, the feedback control portion 3f calculates feedback torques at respective P-control (proportional control) portion 3fa, I-control (integral control) portion 3fb and D-control (differential control) portion 3fc in response to the deviation of acceleration, which is obtained by subtracting the actual acceleration from the demand acceleration set by the memory portion 3d for the norm model. According to the present embodiment, each of the feedback torques calculated at the respective P-, I- and D-control portions 3fa, 3fb and 3fc is corrected by the feedback-torque correcting portion 3i.

More exactly, the feedback-torque correcting portion 3i is divided into three portions, namely a correcting portion 3id for the P-control, a correcting portion 3ie for the I-control and a correcting portion 3if for the D-control. Each of the correcting portions 3id to 3if respectively sets a degree of reliability in accordance with respective input amounts from the feedback control portion 3f. An inside structure for each of the correcting portions 3id to 3if is similar, for example, to that of FIG. 8, wherein the checking items as well as the degree of reliability may be adequately changed depending on characteristics of the respective P-, I- and D-control portions 3fa to 3fc.

As above, each of the feedback torques calculated at the P-, I- and D-control portions 3fa to 3fc is corrected by multiplying different correction coefficients which are individually set. Then, the feedback torques (after correction) are added to each other so as to finally obtain a total feedback torque (after correction) at the feedback-torque correcting portion 3i.

As above, each of the feedback torques calculated at the P-, I- and D-control portions 3fa to 3fc is individually corrected. As a result, in each of P-, I- and D-control portions 3fa to 3fc, each of the feedback torques can be corrected depending on each characteristic of the P-, I- and D-control portions 3fa to 3fc. For example, a response may be emphasized in one of the P-, I- and D-control portions 3fa to 3fc.

Other Embodiments (1) In the above embodiments, the memory portion 3d for the norm model, the feedback control portion 3f and the torque converting portion 3g are used for the feedback control for both of the power-train torque and the braking torque. However, the acceleration control portion 3 may have memory portions (3d) for the norm model, feedback control portions (3f) and torque converting portions (3g) respectively for the feedback control of the power-train torque and the feedback control of the braking torque.

(2) In the above first embodiment, the feedback torque (after correction) is obtained at the feedback-torque correcting portion 3i by multiplying the feedback torque (the output from the feedback control portion 3f) by the coefficient of reliability for the feedback control. According to the second embodiment, each of the feedback torques calculated at the respective P-, I- and D-control portions 3fa, 3fb and 3fc is corrected by multiplying by each of the coefficients individually set by correcting portions 3id to 3if for P-, I- and D-controls, so that the feedback torque (after correction) is finally obtained.

The above two methods may be combined in order to correct the feedback torque. For example, the feedback torques calculated at the respective P-, I- and D-control portions are individually corrected and those corrected feedback torques are added together as in a similar manner to the second embodiment. And then, such added torque is multiplied by the coefficient of the reliability for the feedback control as in a similar manner to the first embodiment, so as to finally obtain the feedback torque (after correction).

(3) In the above embodiments, the aged deterioration, the temperature of the acceleration sensor, the onboard condition, and the level of the punishing road are taken into account for the purpose of calculating the reliability of the estimated slope. However, the reliability of the estimated slope may be calculated based on any other parameters, which may change the reliability of the estimated slope.

(4) In the above embodiments, the demand axle torque is used as the input for carrying out the feed-forward control, and the acceleration is used as the parameter for representing the demand axle torque. In addition, the acceleration is used as the parameter for the feedback control. The present invention may be also applied to an acceleration control apparatus for the vehicle traveling direction, in which the feed-forward control and the feedback control are carried out at the same time, and in which other inputs and other parameters than those of the above embodiments are used.

As a result that the error of the estimated slope is generated, alternate and intermittent driving operation and braking operation are likely to occur. Therefore, the present invention may be preferably applied to the acceleration control apparatus, in which the feed-forward torque is calculated based on the demand axle torque and the torque of the road surface slope, and the power-train feedback torque as well as the braking feedback torque is outputted as the feedback torque.

What is claimed is:

1. In an acceleration control apparatus for a vehicle comprising;
   a feed-forward control portion for carrying out a feed-forward control based on an estimated-slope torque, which is calculated from a demand torque corresponding to a predetermined parameter and an estimated slope of a road surface, so that the feed-forward control portion outputs a feed-forward torque; and
   a feedback control portion for carrying out a feedback control based on the predetermined parameter to output a feedback torque;
   the acceleration control apparatus outputs a demand torque based on the feed-forward torque and the feedback torque in order to control an acceleration of the vehicle in a vehicle traveling direction, and
   the acceleration control apparatus further comprises:
   a reliability calculating portion for calculating reliability of the estimated slope; and
   a feedback torque correcting portion for correcting the feedback torque in such a way that a gain for the feedback control portion, which corresponds to an output of the feedback control portion with respect to an input thereof, is increased in response to a decrease of the reliability of the estimated slope calculated at the reliability calculating portion.

2. The acceleration control apparatus according to the claim 1, further comprising:
   an estimated-slope torque correcting portion for correcting the estimated-slope torque in response to the decrease of the reliability of the estimated slope calculated at the reliability calculating portion,
   wherein the feed-forward control portion calculates the feed-forward torque based on the estimated-slope torque, which is corrected at the estimated-slope torque correcting portion.

3. In an acceleration control apparatus for a vehicle comprising;
   a feed-forward control portion for carrying out a feed-forward control based on an estimated-slope torque, which is calculated from a demand torque corresponding to a predetermined parameter and an estimated slope of a road surface, so that the feed-forward control portion outputs a feed-forward torque; and
   a feedback control portion for carrying out a feedback control based on the predetermined parameter to output a feedback torque;
   the acceleration control apparatus outputs a demand torque based on the feed-forward torque and the feedback torque in order to control an acceleration of the vehicle in a vehicle traveling direction, and
   the acceleration control apparatus further comprises:
   a reliability calculating portion for calculating reliability of the estimated slope;
   a coefficient-of-reliability calculating portion for calculating a coefficient of the reliability for the feedback control, which corresponds to a weighting amount for correcting the feedback torque, depending on the reliability of the estimated slope by increasing the coefficient of the reliability for the feedback control as the reliability of the estimated slope becomes lower; and
   a multiplying portion for multiplying the feedback torque calculated at the feedback control portion by the coefficient of the reliability for the feedback control calculated by the coefficient-of-reliability calculating portion, so as to correct the feedback torque.

4. The acceleration control apparatus according to the claim 2, wherein
   the feed-forward control portion calculates the feed-forward torque based on a demand axle torque corresponding to the demand torque for controlling the acceleration of the vehicle in the vehicle traveling direction and based on the estimated-slope torque (after correction) which is corrected by the estimated-slope torque correcting portion, and
   the feedback torque correcting portion corrects the feedback torque based on the demand axle torque and the estimated-slope torque (after correction).

5. The acceleration control apparatus according to the claim 2, wherein
   the estimated-slope torque correcting portion corrects the estimated-slope torque in such a way that an absolute figure of the estimated-slope torque is decreased in response to the decrease of the reliability of the estimated slope calculated at the reliability calculating portion.

6. The acceleration control apparatus according to the claim 2, wherein
   the estimated-slope torque correcting portion calculates a range of error for the estimated-slope torque in response to the decrease of the reliability of the estimated slope calculated at the reliability calculating portion, and
   the estimated-slope torque correcting portion corrects the estimated-slope torque in accordance with the range of error.

7. The acceleration control apparatus according to the claim 1, wherein
   the feedback torque correcting portion has a map or a function expression, which shows a relationship between the reliability of the estimated slope and a coefficient of the reliability for the feedback control,
   the feedback torque correcting portion calculates the coefficient of the reliability for the feedback control, which corresponds to the reliability of the estimated slope, based on the map or the function expression, and the feedback torque correcting portion corrects the feedback torque based on the coefficient of the reliability for the feedback control.

8. The acceleration control apparatus according to the claim 1, wherein the feed-forward control portion calculates the feed-forward torque based on a demand axle torque corresponding to the demand torque for controlling the acceleration of the vehicle in the vehicle traveling direction and based on the estimated-slope torque (after correction) which is corrected by an estimated-slope torque correcting portion, and the feedback torque correcting portion corrects the feedback torque based on the demand axle torque and the estimated-slope torque (after correction).

9. The acceleration control apparatus according to the claim 8, wherein the feedback torque correcting portion corrects a coefficient of the reliability for the feedback control with respect to the reliability of the estimated slope, in such a manner that the coefficient of the reliability for the feedback control becomes larger when a ratio of an absolute figure of the estimated-slope torque (after correction) against an absolute figure of the demand axle torque becomes larger.

10. The acceleration control apparatus according to the claim 9, wherein the feedback torque correcting portion has multiple maps for a relationship between the coefficient of the reliability for the feedback control and the reliability of the estimated-slope, wherein the relationships in the respective maps are different from each other, and the feedback torque correcting portion selects one of the maps based on the ratio of the absolute figure of the estimated-slope torque (after correction) against the absolute figure of the demand axle torque, wherein the relationship between the coefficient of the reliability for the feedback control and the reliability of the estimated-slope is set in such a manner that a coefficient of the reliability for the feedback control in the map, which is selected when the ratio of the absolute figure of the estimated-slope torque (after correction) with respect to the absolute figure of the demand axle torque is larger, is larger than another coefficient of the reliability for the feedback control in the map, which is selected when the ratio of the absolute figure of the estimated-slope torque (after correction) with respect to the absolute figure of the demand axle torque is smaller.

11. The acceleration control apparatus according to the claim 2, wherein the estimated-slope torque is a physical value, which is converted into a torque from an estimated-slope acceleration applied to the vehicle in the vehicle traveling direction due to the slope of the road surface, the feedback control portion outputs a power-train feedback torque and a brake feedback torque as the feedback torque, and the feed-forward control portion calculates the feed-forward torque based on a demand axle torque corresponding to the demand torque for controlling acceleration of the vehicle in the vehicle traveling direction and based on the estimated-slope torque (after correction) which is corrected by the estimated-slope torque correcting portion.

12. The acceleration control apparatus according to the claim 2, wherein the feedback torque correcting portion has a map or a function expression, which shows a relationship between the reliability of the estimated slope and a coefficient of the reliability for the feedback control, the feedback torque correcting portion calculates the coefficient of the reliability for the feedback control, which corresponds to the reliability of the estimated slope, based on the map or the function expression, and the feedback torque correcting portion corrects the feedback torque based on the coefficient of the reliability for the feedback control.

* * * * *